(12) United States Patent
Shimizu et al.

(10) Patent No.: US 11,993,030 B2
(45) Date of Patent: May 28, 2024

(54) COMPOSITE MATERIAL COMPONENT SHAPING METHOD AND CHARGE

(71) Applicant: MITSUBISHI HEAVY INDUSTRIES, LTD., Tokyo (JP)

(72) Inventors: Masahiko Shimizu, Tokyo (JP); Shoya Mano, Tokyo (JP); Toshiki Kitazawa, Tokyo (JP); Homare Yamato, Tokyo (JP); Kenichi Kawamura, Kasugai (JP); Yoko Taguchi, Nagoya (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 2 days.

(21) Appl. No.: 17/633,389

(22) PCT Filed: Sep. 26, 2019

(86) PCT No.: PCT/JP2019/037774
§ 371 (c)(1),
(2) Date: Feb. 7, 2022

(87) PCT Pub. No.: WO2021/059421
PCT Pub. Date: Jan. 4, 2021

(65) Prior Publication Data
US 2022/0288874 A1 Sep. 15, 2022

(51) Int. Cl.
*B29C 70/34* (2006.01)
*B29C 70/16* (2006.01)
(Continued)

(52) U.S. Cl.
CPC ............ *B29C 70/345* (2013.01); *B29C 70/16* (2013.01); *B29K 2307/04* (2013.01); *B29K 2309/08* (2013.01); *B29L 2031/3076* (2013.01)

(58) Field of Classification Search
CPC ...................................................... B29C 70/345
See application file for complete search history.

(56) References Cited

U.S. PATENT DOCUMENTS

| 6,454,893 | B1 | 9/2002 | McKague et al. |
| 8,758,874 | B2 * | 6/2014 | Taketa .................... B29C 43/20 |
| | | | 428/113 |

(Continued)

FOREIGN PATENT DOCUMENTS

| JP | 2000052468 A | 2/2000 |
| JP | 5161432 B2 | 3/2013 |

(Continued)

OTHER PUBLICATIONS

Extended European Search Report of European Application No. 19946282.1 dated Jul. 7, 2022; 8pp.

(Continued)

*Primary Examiner* — Jeffry H Aftergut
(74) *Attorney, Agent, or Firm* — HAUPTMAN HAM, LLP

(57) ABSTRACT

A method includes laminating a plurality of fiber reinforced sheets to create a charge; and shaping, by pressing, the charge created in the lamination step into a shaping mold. The charge has a predetermined angle layer including the plurality of fiber reinforced sheets, the fiber direction of which is aligned in a single direction. The predetermined angle layer has n-number of constitutional layers (n≥2) ranging from a first constitutional layer to an n-th constitutional layer each including the plurality of fiber reinforced sheets, wherein the n-th constitutional layer is laminated on an (n−1)-th constitutional layer, the plurality of fiber reinforced sheets in each of the constitutional layers have dividing portions which are along the fiber direction and which are disposed one by one at respective positions within a predetermined range along the fiber direction in the predetermined angle layer.

12 Claims, 10 Drawing Sheets

(51) Int. Cl.
*B29K 307/04* (2006.01)
*B29K 309/08* (2006.01)
*B29L 31/30* (2006.01)

(56) References Cited

U.S. PATENT DOCUMENTS

| | | |
|---|---|---|
| 10,099,445 B2 * | 10/2018 | Kismarton ............. B32B 37/18 |
| 2010/0227115 A1 | 9/2010 | Esaki et al. |
| 2012/0076973 A1 | 3/2012 | Guzman et al. |
| 2016/0332413 A1 | 11/2016 | Kismarton |
| 2019/0077048 A1 | 3/2019 | Fujita et al. |
| 2019/0283363 A1 | 9/2019 | Shimono et al. |

FOREIGN PATENT DOCUMENTS

| | | | |
|---|---|---|---|
| JP | 5180606 B2 | 4/2013 |
| JP | 5882361 B2 | 3/2016 |
| JP | 2016180037 A | 10/2016 |
| JP | 2019025847 A | 2/2019 |
| JP | 2019155744 A | 9/2019 |

OTHER PUBLICATIONS

International Search Report and Written Opinion of International Application No. PCT/JP2019/037774 dated Nov. 5, 2019; 14pp.

* cited by examiner

●: SPLIT PORTION (CROSS SECTION A-A (SECTION SA))

11SA (CROSS SECTION B-B (SECTION SB))

11SB (CROSS SECTION C-C (SECTION SC))

11SC

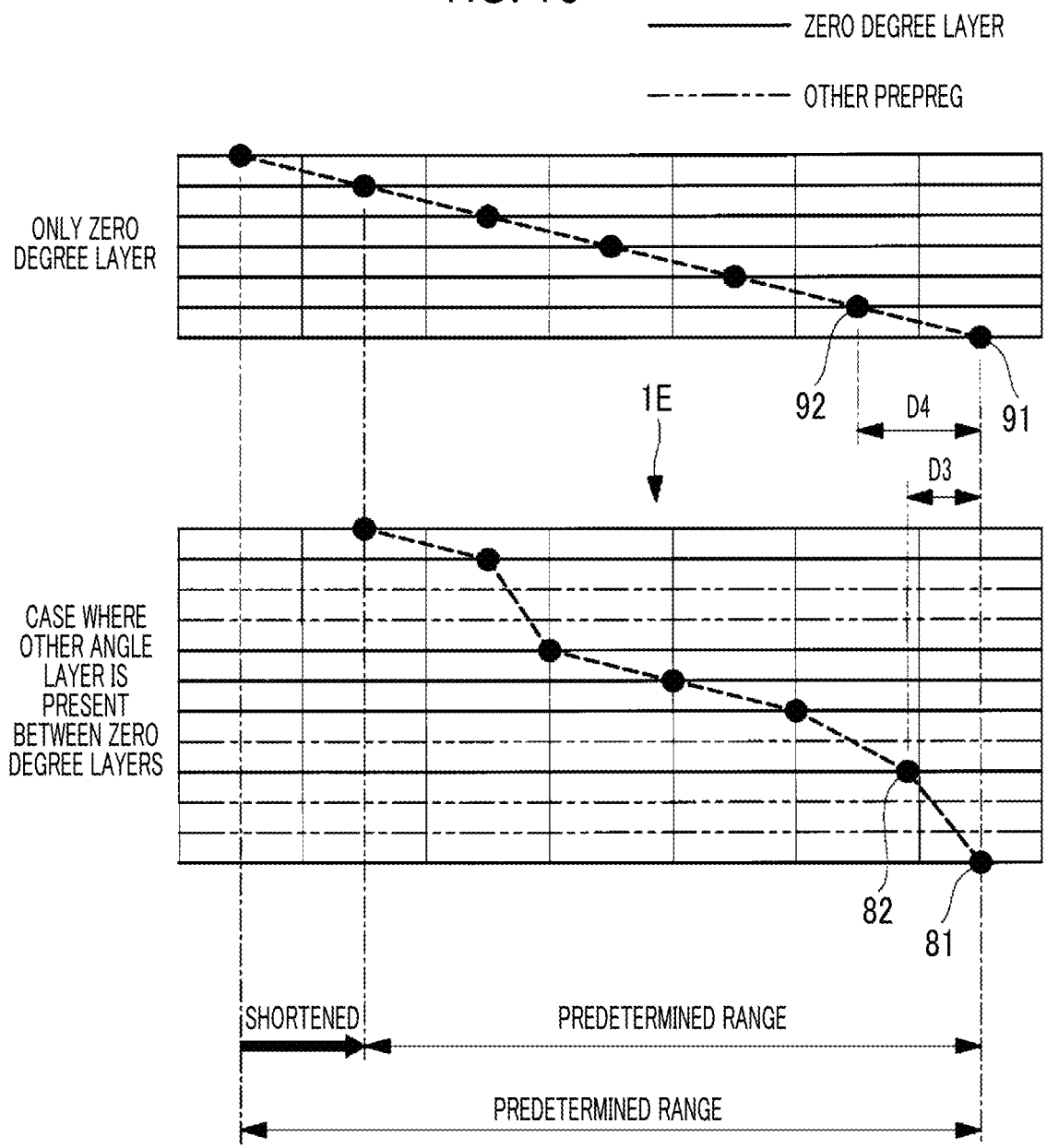

COMPOSITE MATERIAL COMPONENT SHAPING METHOD AND CHARGE

RELATED APPLICATIONS

The present application is a National Phase of International Application Number PCT/JP2019/037774 filed Sep. 26, 2019.

TECHNICAL FIELD

The present disclosure relates to a composite material component shaping method and a charge.

BACKGROUND ART

A forming member of an aircraft has any cross-sectional shape. One of methods for manufacturing the forming member is to obtain a target shape by using a charge in which a plurality of reinforced fiber sheets are laminated.

As the forming members of the aircraft, there are members (for example, a spar and a stringer) having a curvature-provided surface such as a twisted surface, a surface having a changing cross-sectional shape, and a curved surface. When the forming member is manufactured, in a case where a reinforced fiber sheet is folded on a surface intersecting with the curvature-provided surface, a peripheral length difference occurs between an inside and an outside of the reinforced fiber sheet. However, the reinforced fiber sheet is not elastic in a fiber direction. Consequently, in some cases, the peripheral length difference cannot be absorbed depending on an orientation of the reinforced fiber sheet. In this case, there is a possibility that wrinkles or tears may appear in a portion where the length difference occurs.

Therefore, in a case of the reinforced fiber sheet in a direction in which the peripheral length difference cannot be absorbed, there is a method of suppressing the wrinkles or the tears by intentionally splitting fibers of the reinforced fiber sheet.

A plurality of the reinforced fiber sheets forming the charge are prepared not only in one direction but also in a plurality of directions. Accordingly, even when split portions are provided in the reinforced fiber sheets in which fiber directions are aligned in one direction (for example, the direction in which the peripheral length difference cannot be absorbed), strength of the whole charge is guaranteed by another reinforced fiber sheet having no split portion.

For example, as disclosed in PTL 1, according to an alignment example of the split portions, a plurality of the split portions are aligned to form a mirror symmetry with respect to a central surface in a lamination direction along the fiber direction, and to face both outer sides from the central surface in the lamination direction.

CITATION LIST

Patent Literature

[PTL 1] Japanese Patent No. 5180606

SUMMARY OF INVENTION

Technical Problem

However, in PTL 1, there is a portion in which the split portions provided in two reinforced fiber sheets facing the central surface are continuous in the lamination direction. In this portion, shearing forces act on each other between the reinforced fiber sheets adjacent to each other in the lamination direction. Accordingly, there is a possibility that the strength as a laminated product (charge) may decrease.

In addition, a plurality of the split portions are aligned on the same cross section in the lamination direction. Therefore, there is a possibility that a portion where the strength as the laminated product decreases may appear in the lamination direction.

The present disclosure is made in view of the above-described circumstances, and an object thereof is to provide a composite material component shaping method and a charge which can suppress a decrease in strength of a layer having a plurality of reinforced fiber sheets in which fiber directions are aligned and split portions are provided.

Solution to Problem

In order to solve the above-described problems, a composite material component shaping method and a charge according to the present disclosure adopts the following means.

That is, according to an aspect of the present disclosure, there is provided a composite material component shaping method for shaping a charge in which a plurality of reinforced fiber sheets are laminated into a desired shape by using a shaping die. The method includes a lamination step of laminating the plurality of reinforced fiber sheets to manufacture the charge, and a shaping step of shaping the charge manufactured in the lamination step by pressing the charge in the shaping die. The charge includes a predetermined angle layer formed of the plurality of reinforced fiber sheets in which fiber directions are aligned in one direction. The predetermined angle layer has the n-number of forming layers from a first forming layer to the n-th forming layer, each being formed of the plurality of reinforced fiber sheets ($n \geq 2$). The n-th forming layer is laminated on the (n−1)-th forming layer. Each of the plurality of reinforced fiber sheets in each of the forming layers has a split portion in each of the fiber directions at every one location in the predetermined angle layer in a predetermined range along the fiber direction. The respective split portions are regularly and repeatedly aligned in each of the forming layers along the fiber direction of the predetermined angle layer, and are aligned not to overlap each other in a lamination direction of the predetermined angle layer.

In addition, according to another aspect of the present disclosure, there is provided a charge in which a plurality of reinforced fiber sheets are laminated. The charge includes a predetermined angle layer formed of the plurality of reinforced fiber sheets in which fiber directions are aligned in one direction. The predetermined angle layer has the n-number of forming layers from a first forming layer to the n-th forming layer, each being formed of the plurality of reinforced fiber sheets ($n \geq 2$). The n-th forming layer is laminated on the (n−1)-th forming layer. Each of the plurality of reinforced fiber sheets in each of the forming layers has a split portion in each of the fiber directions at every one location in the predetermined angle layer in a predetermined range along the fiber direction. The respective split portions are regularly and repeatedly aligned in each of the forming layers along the fiber direction of the predetermined angle layer, and are aligned not to overlap each other in a lamination direction of the predetermined angle layer.

Advantageous Effects of Invention

According to the composite material component shaping method and the charge of the present disclosure, it is possible to suppress a decrease in strength of the predetermined angle layer having the plurality of reinforced fiber sheets in which the fiber directions are aligned and the split portions are provided.

BRIEF DESCRIPTION OF DRAWINGS

FIG. 13 is a longitudinal sectional view of a charge according to Modification Example 2 of the present disclosure.

DESCRIPTION OF EMBODIMENTS

First Embodiment

Hereinafter, a composite material component shaping method and a charge of the according to a first embodiment of the present disclosure will be described with reference to the drawings.

A composite material component shaping method according to the present embodiment shapes a charge 1A in which a plurality of prepregs (reinforced fiber sheets) 10 are laminated into a desired shape by using a shaping die 50.

The charge 1A is formed so that the plurality of prepregs 10 are laminated.

The prepreg 10 has a flat sheet shape. One prepreg 10 is formed of a fiber base material in which fiber directions are aligned in one direction and a resin contained in the fiber base material. Any fiber such as a carbon fiber and a glass fiber is used for the fiber base material. As the resin contained in the fiber base material, for example, it is possible to use a thermosetting resin cured by heating, such as epoxy resin, polyimide, polyurethane, and unsaturated polyester. In addition, it is also possible to use a thermoplastic resin solidified by heating, such as polyamide, polyethylene, polystyrene, and polyvinyl chloride. Fiber reinforced plastic is formed of a fiber base material 20 and the resin.

The fiber base material 20 is a laminated body formed of a plurality of sheet-shaped members, and the sheet-shaped members are laminated as many as a required number in accordance with a thickness of a molded product. Any fiber such as the carbon fiber and the glass fiber is used for the fiber base material 20.

As the resin contained in the fiber base material 20, for example, it is possible to use thermosetting resin cured by heating, such as epoxy resin, polyimide, polyurethane, and unsaturated polyester. Alternatively, it is also possible to use the thermoplastic resin solidified by heating, such as polyamide (for example, nylon (registered trademark)), polyethylene, polystyrene, and polyvinyl chloride.

For example, the charge 1A is formed so that the prepreg 10 having the fiber direction of zero degrees, the prepreg 10 having the fiber direction of 45 degrees, the prepreg 10 having the fiber direction of −45 degrees, and the prepreg 10 having the fiber direction of 90 degrees are laminated in any desired way. A pattern in the fiber direction, the number of the prepregs 10 in each fiber direction, or a sequencer of lamination layers is appropriately designed depending on specifications of the composite material component. For example, the charge 1A may be formed of only the prepreg 10 having the fiber direction of zero degrees, or the charge 1A may be formed of the prepreg 10 having the fiber direction of zero degrees and the prepreg 10 having the fiber direction of 90 degrees.

Figure 1:
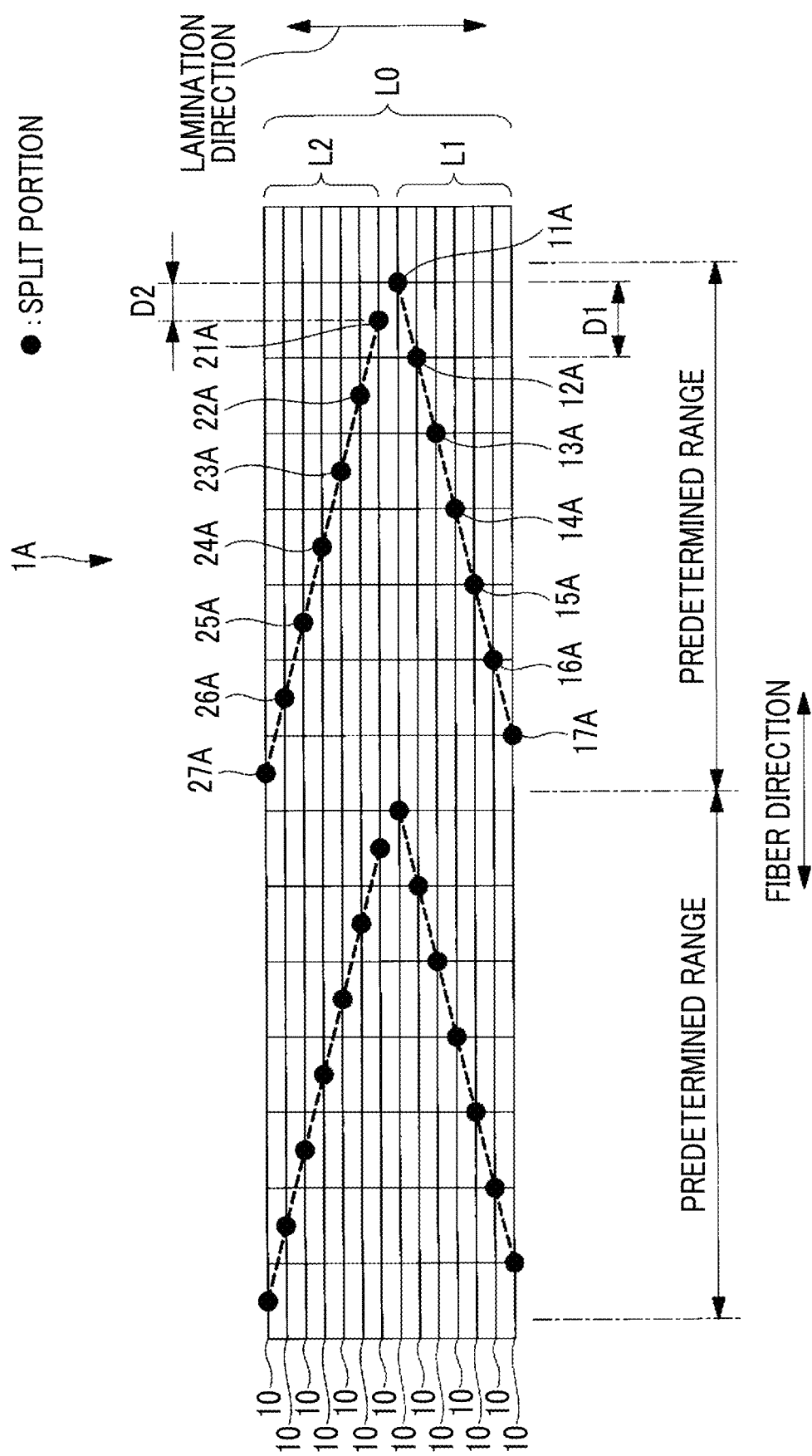
FIG. 1 is a longitudinal sectional view of a charge according to a first embodiment of the present disclosure.

FIG. 1 illustrates only a zero degree layer L0 formed of the plurality of prepregs 10 in which the fiber directions are aligned to zero degrees as a predetermined angle with regard to the charge 1A used for shaping the composite material component. In addition, in the drawing, the fiber direction coincides with a rightward-leftward direction on the drawing, and the lamination direction coincides with an upward-downward direction on the drawing.

The zero degree layer L0 has 14 prepregs 10 in the drawing. The zero degree layer L0 has two forming layers such as a first forming layer L1 and a second forming layer L2 laminated on the first forming layer L1 in the lamination direction. Each of the first forming layer L1 and the second forming layer L2 has 7 prepregs 10.

The forming layers referred to herein are divided for convenience, and actually, each forming layer integrally forms the zero degree layer L0. In addition, the number of the prepregs 10 can be changed in any desired way.

When the zero degree layer L0 is viewed as a whole, every one of 14 prepregs 10 is provided with one split portion (split portions at 14 locations in total) in a predetermined range along the fiber direction. In addition, every one sheet of 7 prepregs 10 belonging to the first forming layer L1 is provided with one split portion (split portions at 7 locations in total) in the same predetermined range. Similarly, every one of 7 prepregs 10 belonging to the second forming layer L2 is provided with one split portion (split portions at 7 locations in total) in the same predetermined range.

The first forming layer L1 has split portions 11A to 17A in order from one end side (for example, a right side) in the fiber direction in the predetermined range. The split portion 17A is located on the other end side (left side in the drawing) in the fiber direction in the predetermined range. In addition, the split portion 11A is aligned with the prepreg 10 facing the second forming layer L2.

In this case, in the first forming layer L1, the split portions of the two prepregs 10 adjacent to each other in the lamination direction are aligned to be adjacent to each other also in the fiber direction as well. In addition, in the fiber direction, the split portions 11A to 17A are aligned with each other at an equal interval. For example, a separation distance therebetween is D1, and in the drawing, a relationship between the split portion 11A and the split portion 12A is illustrated. For example, D1 is 1 inch (approximately 25.4 mm). In addition, when D1 is 1 inch, a dimension in the predetermined range in the fiber direction is approximately 7 inches.

The split portions 11A to 17A are aligned in the first forming layer L1 as described above. In this manner, each of the split portions (split portions 11A to 17A) is can be aligned at an equal interval on a straight line connecting the split portion 11A and the split portion 17A.

The second forming layer L2 has split portions 21A to 27A in order from one end side (for example, the right side) in the fiber direction in the predetermined range. The split portion 27A is located on the other end side (left side in the drawing) in the fiber direction in the predetermined range. In addition, the split portion 21A is aligned with the prepreg 10 facing the first forming layer L1.

In this case, in the second forming layer L2, the split portions of the two prepregs 10 adjacent to each other are aligned to be adjacent to each other in the fiber direction as well. In addition, the split portions 21A to 27A are aligned at an equal interval in the fiber direction (similarly to the first forming layer L1).

The split portions 21A to 27A are aligned in the second forming layer L2 as described above. In this manner, each of the split portions (split portions 21A to 27A) can be aligned at an equal interval on a straight line connecting the split portions 21A and 27A.

When the zero degree layer L0 is viewed as a whole, in each of the split portions, the split portion 11A, the split portion 21A, the split portion 12A, the split portion 22A, the split portion 13A, the split portion 23A, the split portion 14A, the split portion 24A, the split portion 15A, the split portion 25A, the split portion 16A, the split portion 26A, the split portion 17A, and the split portion 27A are aligned in order from one end side (for example, the right side) in the fiber direction in the predetermined range. In addition, when the forming layers are viewed in units, in each of the split portions, the first forming layer L1, the second forming layer L2, the first forming layer L1, . . . , and the second forming layer L2 are regularly and repeatedly aligned in order from one end side in the fiber direction in the predetermined range. That is, a configuration is adopted so that the split portions are not continuously aligned in the same forming layer in order from one end side in the fiber direction in the predetermined range.

In this case, when the zero degree layer L0 is viewed as a whole, the split portion 11A and the split portion 21A which are adjacent to each other in the fiber direction are separated from each other by D2 in the fiber direction. That is, the respective split portions are aligned not to overlap each other in the lamination direction of the zero degree layer L0.

When the number of the forming layers is defined as n, it is preferable that D2 is 1/n of D1. In a case of the drawing, since the number of the forming layers is 2 (n=2), it is preferable that D2 is ½ of D1. In this manner, a distance between the split portions adjacent to each other in the fiber direction can be uniform in the whole zero degree layer L0, and it is possible to suppress fluctuations in strength of the zero degree layer L0 (strength of the charge 1A which is guaranteed by the zero degree layer L0) along the fiber direction.

For example, the charge 1A and the prepreg 10 which are described above are shaped into a desired shape by being used as follows.

FIGS. 2 to 5 illustrate simple examples of shaping dies 50A to 50D in which the charge 1A is pressed.

Figure 2:
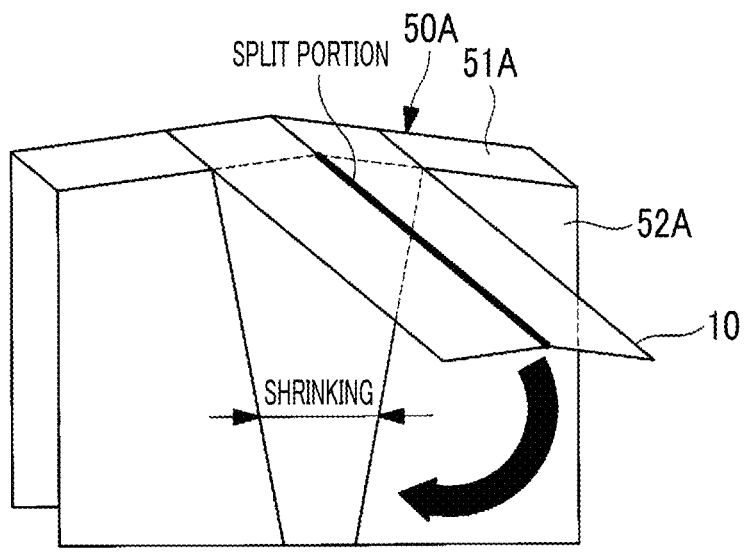
FIG. 2 is a perspective view illustrating a prepreg and a shaping die according to an embodiment of the present disclosure.

The shaping die 50A illustrated in FIG. 2 has a first surface 51A having a folded curved surface projecting upward on the drawing, and a second surface 52A intersecting with the first surface 51A.

Figure 3:
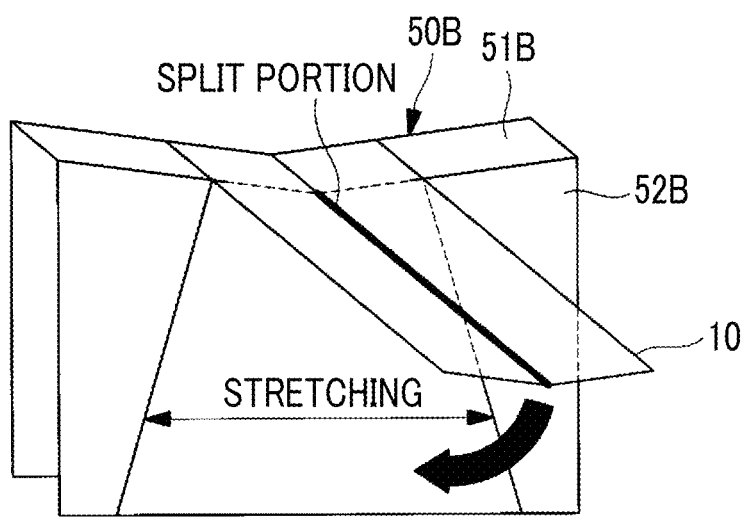
FIG. 3 is a perspective view illustrating the prepreg and the shaping die according to the embodiment of the present disclosure.

The shaping die 50B illustrated in FIG. 3 has a first surface 51B having a folded curved surface projecting downward on the drawing, and a second surface 52B intersecting with the first surface 51B.

Figure 4:
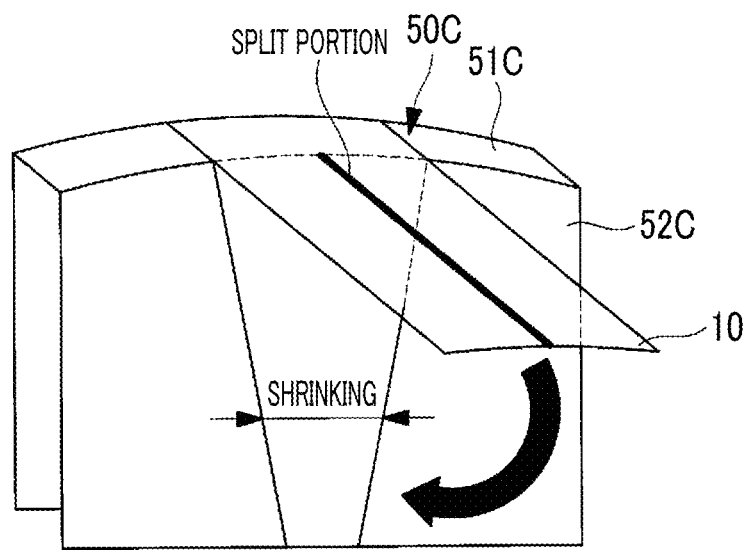
FIG. 4 is a perspective view illustrating the prepreg and the shaping die according to the embodiment of the present disclosure.

The shaping die 50C illustrated in FIG. 4 has a first surface 51C having a curved surface projecting upward on the drawing, and a second surface 52C intersecting with the first surface 51C.

Figure 5:
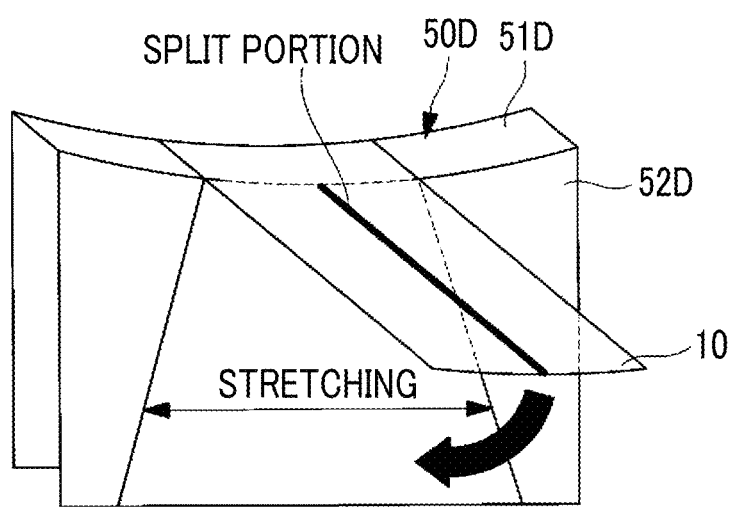
FIG. 5 is a perspective view illustrating the prepreg and the shaping die according to the embodiment of the present disclosure.

The shaping die 50D illustrated in FIG. 5 has a first surface 51D having a curved surface projecting downward on the drawing, and a second surface 52A intersecting with the first surface 51D.

The shaping die 50A illustrated in FIG. 2 will be described as an example. The prepreg 10 is aligned on the first surface 51A (first surface alignment step). In addition, the same prepreg 10 is aligned on the second surface 52A (second surface alignment step). This step is repeatedly performed so that the prepregs 10 are laminated (lamination step). In this case, the fiber direction of the prepreg 10 serving as the zero degree layer L0 is caused to coincide with a changing direction of the curved surface. In a case of FIG. 2, the fiber direction of the zero degree layer L0 is caused to coincide with the rightward-leftward direction on the drawing. In addition, during the lamination step or before the lamination step, the split portion is provided at a proper location of the prepreg 10 (splitting step).

The prepreg 10 aligned on the second surface 52 is in a folded state with respect to the prepreg 10 aligned on the first surface 51A. In this state, the prepreg 10 is pressed and shaped (shaping step). In this case, the split portion absorbs shrinking of the prepreg 10 on the second surface 52A which is affected by the curved surface. In a case of the shaping die 50C illustrated in FIG. 4, the split portion similarly absorb shrinking of the prepreg 10 on the second surface 52C which is affected by the curved surface. On the other hand, in a case of the shaping die 50B illustrated in FIG. 3 and the shaping die 50D illustrated in FIG. 4, the split portion allows stretching of the prepreg 10 on the second surface 52B and the second surface 52D which is affected by the curved surface.

The split portion may be provided only in a range of the prepreg 10 aligned on the second surface 52A. In this manner, it is possible to reduce labor required for a step of providing the split portion. The same applies to the second surface 52B, the second surface 52C, and the second surface 52D.

When the prepreg 10 is completely laminated and the charge 1A is prepared, the charge 1A is cured to obtain the composite material component having a desired shape.

In the above description, the simple shaping die 50A has been described as an example. However, for example, a shaping die 50E as illustrated in FIG. 6 may be used.

The shaping die 50E is an elongated member having a substantially U-shaped cross-sectional shape, and an upper surface in the drawing is a first surface 51E and both side surfaces are second surfaces 52E.

Figure 7:
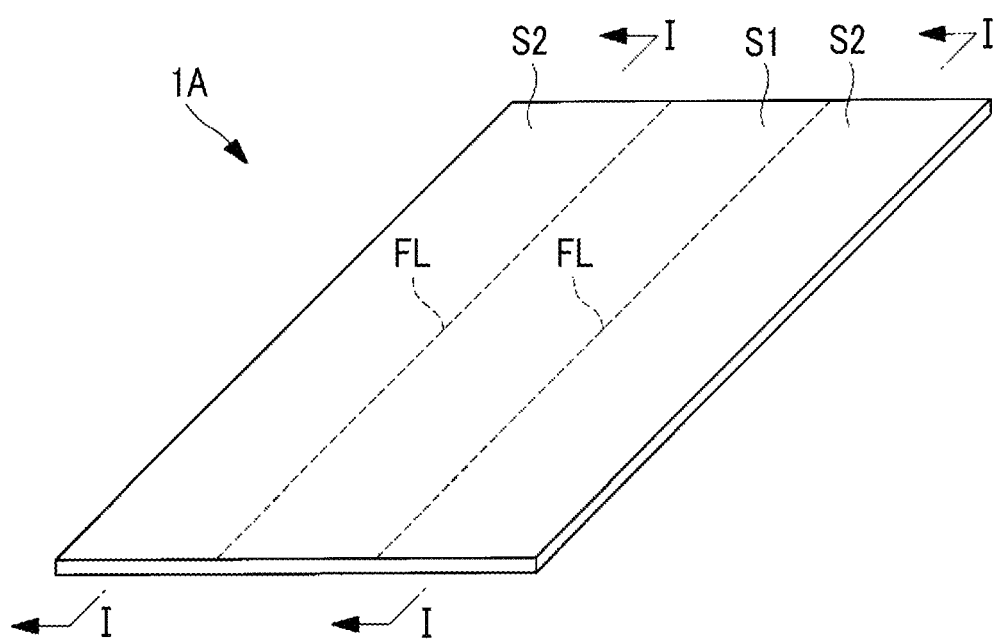
FIG. 7 is a view illustrating an example of the charge which can correspond to the shaping die illustrated in FIG. 6.

For example, the charge 1A as illustrated in FIG. 7 is aligned in the shaping die 50E. The charge 1A is divided into one surface S1 and two surfaces S2 by two folding lines FL.

Figure 6:
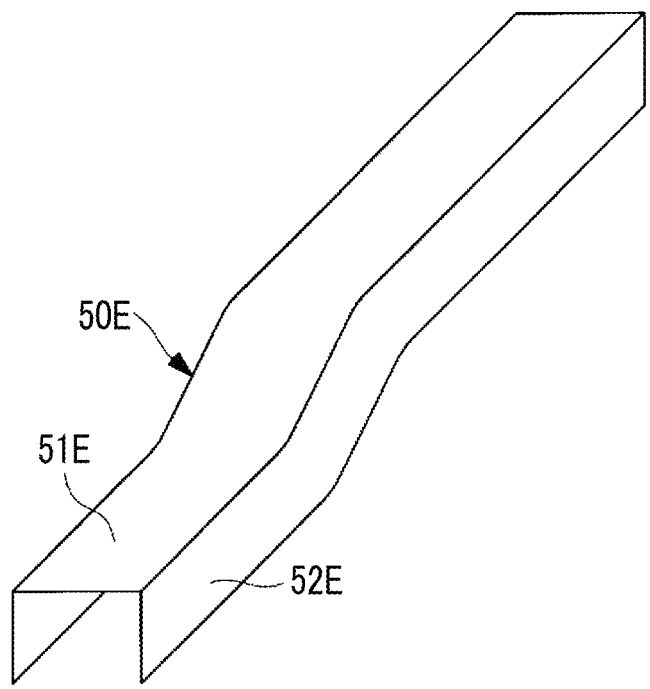
FIG. 6 is a perspective view illustrating another example of the shaping die according to the embodiment of the present disclosure.

An extending direction of the folding line FL corresponds to a longitudinal direction of the shaping die 50E (refer to FIG. 6). A dimension between the two folding lines FL corresponds to a width dimension of the first surface 51E of the shaping die 50E (refer to FIG. 6).

The surface S1 is a surface pinched between the two folding lines LA, and is a surface aligned along the first surface 51E of the shaping die 50E (refer to FIG. 6).

The surfaces S2 are surfaces on an edge side of the charge 1A from each of the folding lines FL, and are surfaces respectively aligned toward the second surface 52E of the shaping die 50E (refer to FIG. 6).

The split portion is provided in the charge 1A on the surface S2. For example, a longitudinal cross section along a cutting line I-I has the split portion as illustrated in FIG. 1. In this manner, the split portion absorbs the shrinking of the charge 1A on the second surface 52E which is affected by the first surface 51E having a curved surface shape formed in the shaping die 50E (refer to FIG. 6), and allows the stretching. A form of the split portion on the surface S2 is not limited to that illustrated in FIG. 1, and any form illustrated in FIGS. 9 to 11 (to be described later) may be used.

The composite material component obtained in this way is used for forming members of aircraft (spar and stringer), for example.

According to the present embodiment, the following advantageous effects are achieved.

The zero degree layer L0 has the first forming layer L1 and the second forming layer L2, each of which is formed of the 7 prepregs 10. In this case, the 7 prepregs 10 in each of the forming layers have the split portions 11A to 17A and the split portions 21A to 27A which are respectively divided in the fiber direction at every one location in the zero degree layer L0 in the predetermined range. In this manner, elasticity of the zero degree layer L0 in the fiber direction can be improved.

Figure 8:
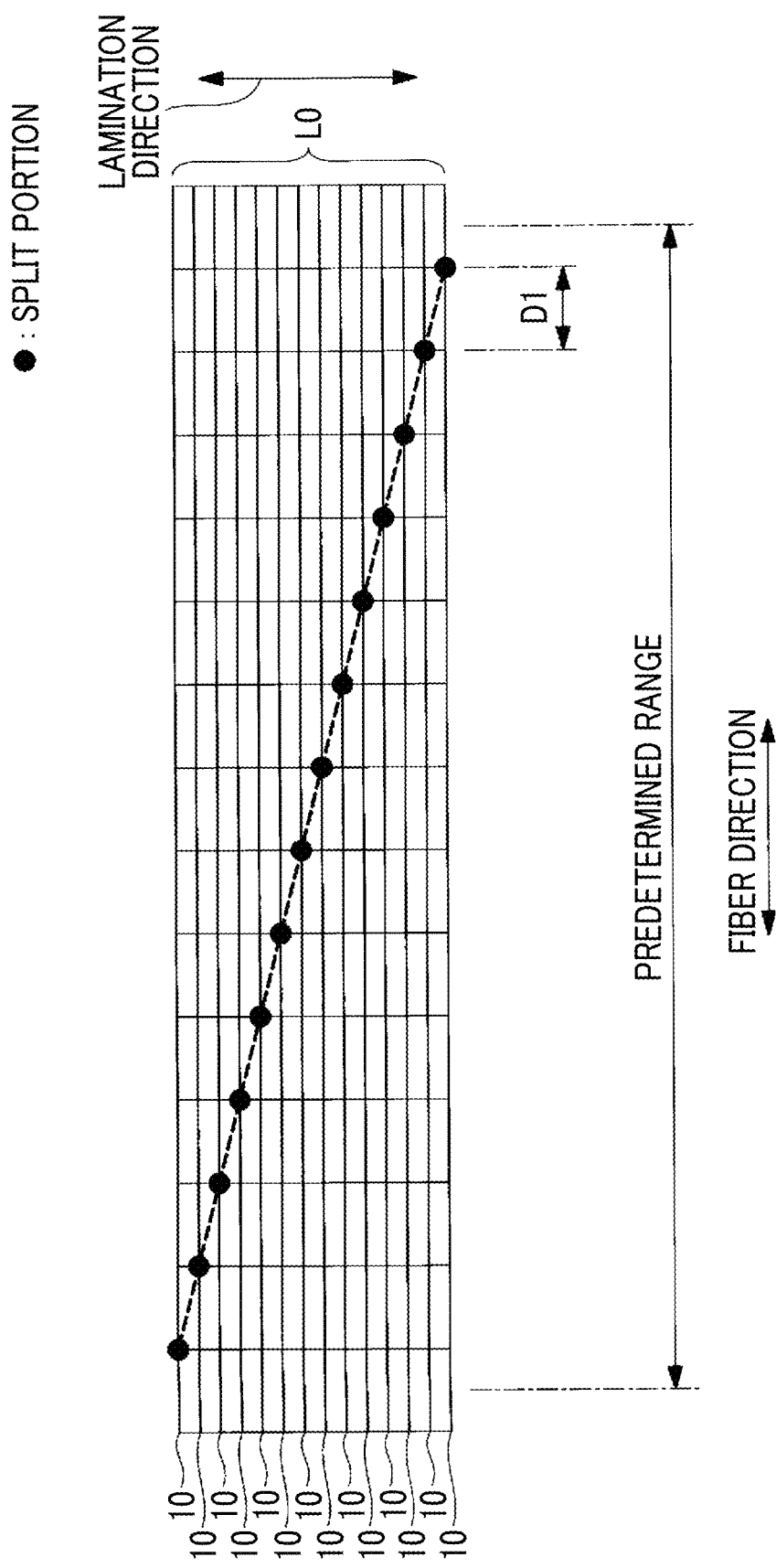
FIG. 8 is a longitudinal sectional view of a charge according to a comparative example.

In addition, when the zero degree layer L0 is viewed as a whole, the respective split portions are regularly and repeatedly aligned in each of the forming layers along the fiber direction of the zero degree layer L0. For example, when the zero degree layer L0 is formed by the first forming layer L1 and the second forming layer L2, the respective split portions are aligned in order of the first forming layer L1, the second forming layer L2, the first forming layer L1, and so forth along the fiber direction of the zero degree layer L0. That is, the split portions are not continuously aligned in the same forming layer along the fiber direction of the zero degree layer L0. In this manner, for example, compared to the zero degree layer L0 (refer to FIG. 8 as a comparative example) in which the same number of prepregs 10 are laminated as a whole and are not divided in the lamination direction, while a distance between the split portions adjacent to each other in the fiber direction in the same forming layer can be secured to approximately the same degree (D1 in the drawing), the predetermined range in the fiber direction in the whole zero degree layer L0 can be shortened. Specifically, when D1 is 1 inch, the dimension of the predetermined range illustrated in FIG. 1 is approximately 7 inches, and the dimension of the predetermined range illustrated in FIG. 8 is approximately 14 inches. Therefore, shaping performance of the charge 1A can be improved while the strength of the zero degree layer L0 is maintained.

In addition, when the zero degree layer L0 is viewed as a whole, the respective split portions are aligned not to overlap each other in the lamination direction of the prepreg 10. In this manner, it is possible to avoid the plurality of split portions from being aligned in the same cross section in the lamination direction of the zero degree layer L0, and it is possible to suppress a decrease in the strength of the zero degree layer L0 in the same cross section. In addition, it is possible to eliminate a portion in which the split portions are continuous in the lamination direction between the prepregs 10 adjacent to each other. When there exists a portion where the split portions are continuous in the lamination direction, there is a possibility that the strength of the zero degree layer L0 (strength of the charge 1A which is guaranteed by the zero degree layer L0) may decrease in the portion. However, the portion where the split portions are continuous in the lamination direction can be eliminated. Accordingly, the decrease in the strength of the zero degree layer L0 can be suppressed by suppressing influence of shearing forces acting on each other between the prepregs 10 adjacent to each other.

Second Embodiment

Hereinafter, a composite material component shaping method and a charge according to a second embodiment of the present disclosure will be described with reference to the drawings.

The present embodiment is different from the first embodiment in the alignment of the split portions. Therefore, in the following description, the same reference numerals will be assigned to configurations the same as those in the first embodiment, and different configurations will be described.

Figure 9:
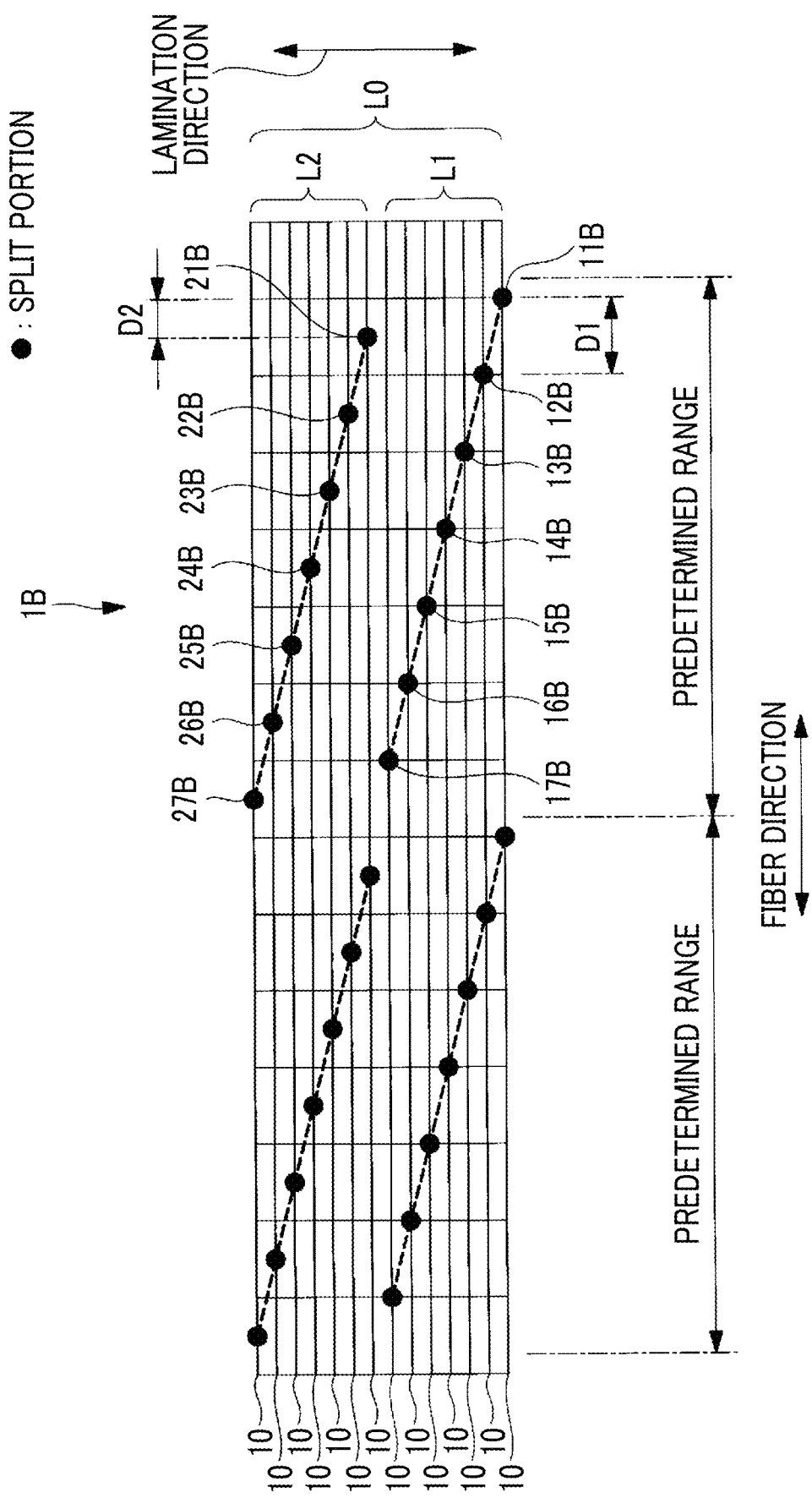
FIG. 9 is a longitudinal sectional view of a charge according to a second embodiment of the present disclosure.

FIG. 9 illustrates only the zero degree layer L0 formed of the plurality of prepregs 10 in which fiber directions are aligned to zero degrees with regard to a charge 1B used for shaping the composite material component. In addition, in the drawing, the fiber direction coincides with a rightward-leftward direction on the drawing, and the lamination direction coincides with an upward-downward direction on the drawing.

The first forming layer L1 has split portions 11B to 17B in order from one end side (for example, the right side) in the fiber direction in the predetermined range. The split portion 17B is located on the other end side (left side in the drawing) in the fiber direction in the predetermined range. In addition, the split portion 17B is aligned with the prepreg 10 facing the second forming layer L2.

The second forming layer L2 has split portions 21B to 27B in order from one end side (for example, the right side) in the fiber direction in the predetermined range. The split portion 27B is located on the other end side (left side in the drawing) in the fiber direction in the predetermined range. In addition, the split portion 21B is aligned with the prepreg 10 facing the first forming layer L1.

According to the present embodiment, the following advantageous effects are achieved.

According to the above-described configuration, the split portion 17B of the first forming layer L1 and the split portion 21B of the second forming layer L2 can be separated farthest from each other to be aligned along the fiber direction in the predetermined range. When the split portions at two locations are aligned to be close to each other, there is a possibility that the strength of the zero degree layer L0

(strength of the charge 1B which is guaranteed by the zero degree layer L0) may decrease in the portion due to the influence of the shearing forces acting on each other between the prepregs 10 adjacent to each other in the lamination direction. However, the split portions at two locations are aligned by being separated from each other. In this manner, it is possible to suppress the decrease in the strength of the zero degree layer L0.

Third Embodiment

Hereinafter, a composite material component shaping method and a charge according to a third embodiment of the present disclosure will be described with reference to the drawings.

The present embodiment is different from the first embodiment and the second embodiment in the number of the forming layers and the alignment of the split portions. Therefore, in the following description, the same reference numerals will be assigned to configurations the same as those in the first embodiment and the second embodiment, and different configurations will be described.

Figure 10:
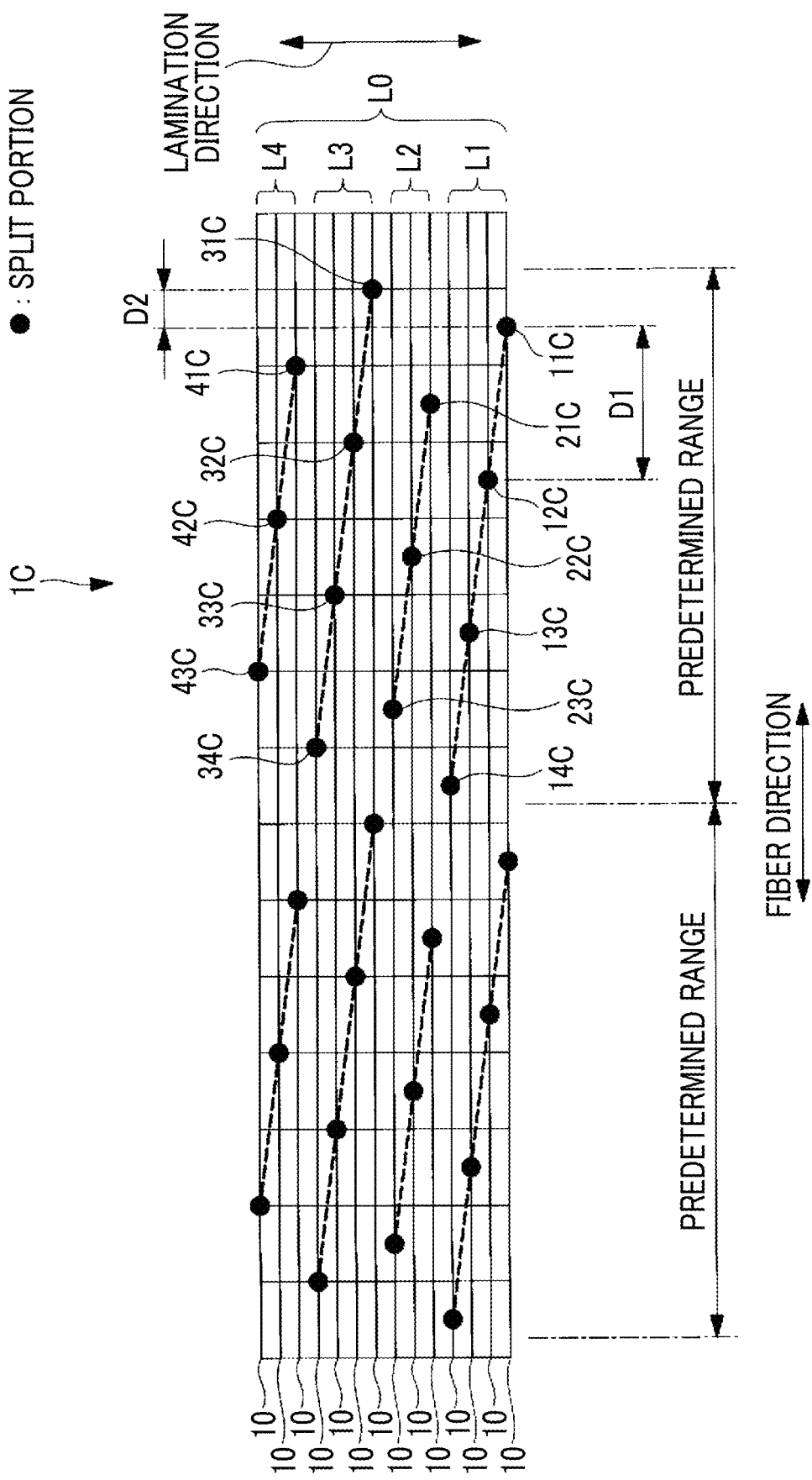
FIG. 10 is a longitudinal sectional view of a charge according to a third embodiment of the present disclosure.

FIG. 10 illustrates only the zero degree layer L0 formed of the plurality of prepregs 10 in which the fiber directions are aligned at zero degrees with regard to a charge 1C used for shaping the composite material component. In addition, in the drawing, the fiber direction coincides with a rightward-leftward direction on the drawing, and the lamination direction coincides with an upward-downward direction on the drawing.

The zero degree layer L0 has 14 prepregs 10 in the drawing. The zero degree layer L0 has four forming layers of the first forming layer L1 to the fourth forming layer L4 in the lamination direction. The second forming layer L2 is laminated on the first forming layer L1, the third forming layer L3 is laminated on the second forming layer L2, and the fourth forming layer L4 is laminated on the third forming layer L3. Each of the first forming layer L1 and the third forming layer L3 has four prepregs 10, and each of the second forming layer L2 and the fourth forming layer L4 has three prepregs 10. The forming layers referred to herein are divided for convenience, and actually, each forming layer integrally forms the zero degree layer L0. In addition, the number of the prepregs 10 can be changed in any desired way.

When the zero degree layer L0 is viewed as a whole, every one of 14 prepregs 10 is provided with one split portion (split portions at 14 locations in total) in a predetermined range along the fiber direction. In addition, in the same predetermined range, every one of the four prepregs 10 belonging to each of the first forming layer L1 and the third forming layer L3 is provided with the split portion at one location (four split portions in total). Similarly, in the same predetermined range, every one of the three prepregs 10 belonging to the second forming layer L2 and the fourth forming layer L4 is provided with the split portion at one location (three split portions in total).

The first forming layer L1 has split portions 11C to 14C in order from one end side (for example, the right side) in the fiber direction in the predetermined range. The split portion 14C is located on the other end side (left side in the drawing) in the fiber direction in the predetermined range. In addition, the split portion 14C is aligned with the prepreg 10 facing the second forming layer L2.

In this case, in the first forming layer L1, the split portions of the two prepregs 10 adjacent to each other in the lamination direction are aligned to be adjacent to each other in the fiber direction as well. In addition, in the fiber direction, the split portions 11C to 14C are aligned at an equal interval. For example, a separation distance therebetween is D1, and in the drawing, a relationship between the split portion 11C and the split portion 12C is illustrated. For example, D1 is 2 inches. In addition, when D1 is 2 inches, the dimension in the predetermined range in the fiber direction is approximately 7 inches.

The split portions 11C to 14C are aligned in the first forming layer L1 as described above. In this manner, the respective split portions (split portions 11C to 14C) can be aligned at an equal interval on a straight line connecting the split portion 11C and the split portion 14C.

The second forming layer L2 has split portions 21C to 23C in order from one end side (for example, the right side) in the fiber direction in the predetermined range. The split portion 23C is located on the other end side (left side in the drawing) in the fiber direction in the predetermined range. In addition, the split portion 21C is aligned with the prepreg 10 facing the first forming layer L1, and the split portion 23C is aligned with the prepreg 10 facing the third forming layer L3.

In this case, in the second forming layer L2, the split portions of the two prepregs 10 adjacent to each other are aligned to be adjacent to each other in the fiber direction as well. In addition, in the fiber direction, the split portions 21C to 23C are aligned at an equal interval (similarly to the first forming layer L1).

The split portions 21C to 23C are aligned in the second forming layer L2 as described above. In this manner, the respective split portions (split portions 21C to 23C) can be aligned at an equal interval on a straight line connecting the split portion 21C and the split portion 23C.

The third forming layer L3 has split portions 31C to 34C in order from one end side (for example, the right side) in the fiber direction in the predetermined range. The split portion 34C is located on the other end side (left side in the drawing) in the fiber direction in the predetermined range. In addition, the split portion 31C is aligned with the prepreg 10 facing the second forming layer L2, and the split portion 34C is aligned with the prepreg 10 facing the fourth forming layer L4.

In this case, in the third forming layer L3, the split portions of the two prepregs 10 adjacent to each other in the lamination direction are aligned to be adjacent to each other in the fiber direction as well. In addition, in the fiber direction, the split portions 31C to 34C are aligned at an equal interval (similarly to the first forming layer L1).

The split portions 31C to 34C are aligned in the third forming layer L3 as described above. In this manner, the respective split portions (split portions 31C to 34C) can be aligned at an equal interval on a straight line connecting the split portion 31C and the split portion 34C.

The fourth forming layer L4 has split portions 41C to 43C in order from one end side (for example, the right side) in the fiber direction in the predetermined range. The split portion 43C is located on the other end side (left side in the drawing) in the fiber direction in the predetermined range. In addition, the split portion 41C is aligned with the prepreg 10 facing the third forming layer L3.

In this case, in the fourth forming layer L4, the split portions of the two prepregs 10 adjacent to each other are aligned to be adjacent to each other in the fiber direction as well. In addition, in the fiber direction, the split portions 41C to 43C are aligned at an equal interval (similarly to the first forming layer L1).

The split portions 41C to 43C are aligned in the fourth forming layer L4 as described above. In this manner, the respective split portions (split portions 41C to 43C) can be aligned at an equal interval on a straight line connecting the split portion 41C and the split portion 43C.

When the zero degree layer L0 is viewed as a whole, each split portion includes the split portion 31C, the split portion 11C, the split portion 41C, the split portion 21C, the split portion 32C, the split portion 12C, the split portion 42C, the split portion 22C, the split portion 33C, the split portion 13C, the split portion 43C, the split portion 23C, the split portion 34C, and the split portion 14C are aligned in order from one end side (for example, the right side) in the fiber direction in the predetermined range. In addition, when the forming layers are viewed in units, in each of the split portions, the third forming layer L3, the first forming layer L1, the fourth forming layer L4, the second forming layer L2, the third forming layer L3, the first forming layer L1, the fourth forming layer L4, the second forming layer L2, and so forth are regularly and repeatedly aligned in order from one end side in the fiber direction in the predetermined range. That is, a configuration is adopted so that the split portions are not continuously aligned in the same forming layer in order from one end side in the fiber direction in the predetermined range.

In this case, when the zero degree layer L0 is viewed as a whole, the split portions 31C and the split portions 11C which are adjacent to each other in the fiber direction are separated from each other by D2 in the fiber direction. That is, the respective split portions are aligned not to overlap each other in the lamination direction of the zero degree layer L0.

When the number of the forming layers is defined as n, it is preferable that D2 is 1/n of D1. In a case of the drawing, since the number of forming layers is 4 (n=4), it is preferable that D2 is ¼ of D1. In this manner, a distance between the split portions adjacent to each other in the fiber direction can be uniform in the whole zero degree layer L0, and it is possible to suppress fluctuations in the strength of the zero degree layer L0 (strength of the charge 1C which is guaranteed by the zero degree layer L0) along the fiber direction.

According to the present embodiment, the following advantageous effects are achieved.

According to the above-described configuration, the number of prepregs 10 per one forming layer can be reduced. In this case, for example, when the predetermined range is the same as that in a case where the zero degree layer is formed by two forming layers (that is, the dimensions in the fiber direction are the same as each other), the split portions adjacent to each other in the fiber direction in the same forming layer can be further separated from each other at an interval. Therefore, the strength of the zero degree layer L0 (strength of the charge 1C which is guaranteed by the zero degree layer L0) can be improved by suppressing the influence of the shearing forces acting on each other between the prepregs 10 adjacent to each other.

Modification Example 1

Figure 11:
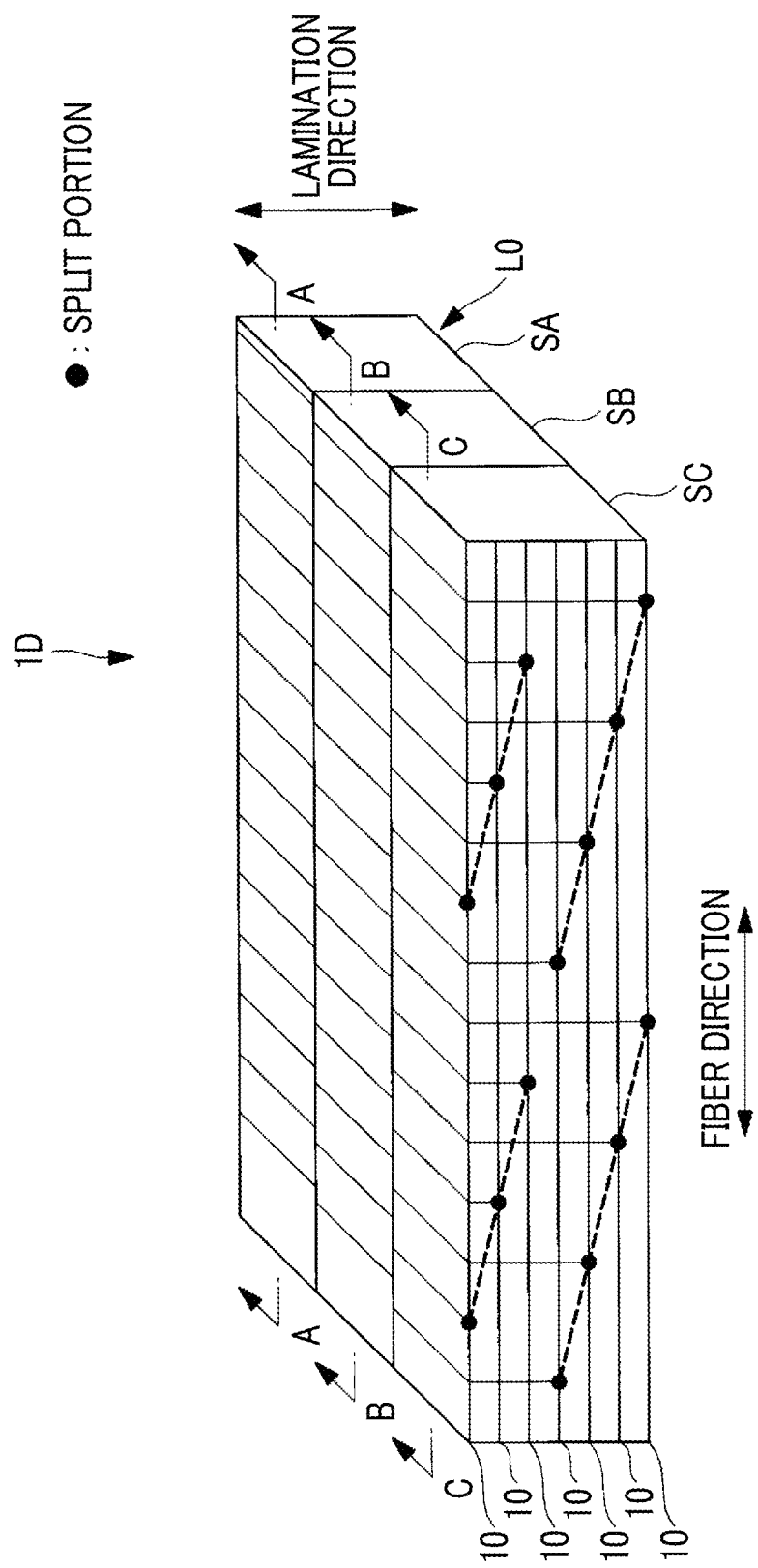
FIG. 11 is a view illustrating a charge according to Modification Example 1 of the present disclosure.
Figure 12:
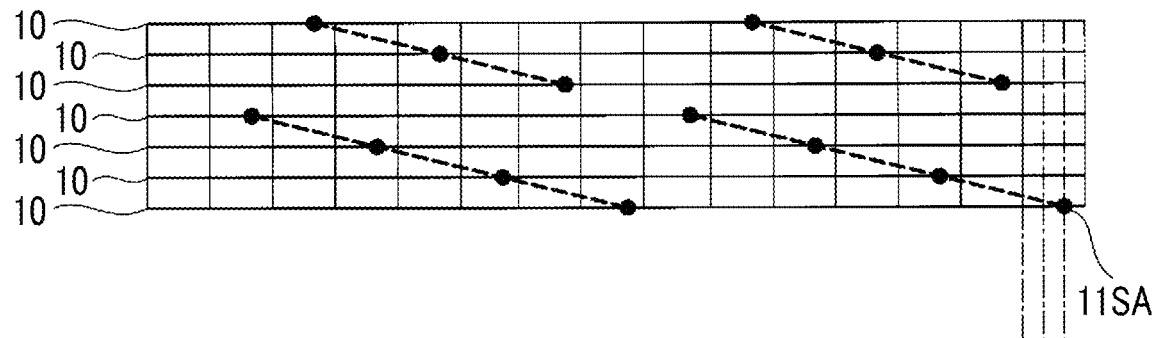
FIG. 12 is a longitudinal sectional view of the charge in each cutting line illustrated in FIG. 11.
Figure 12:
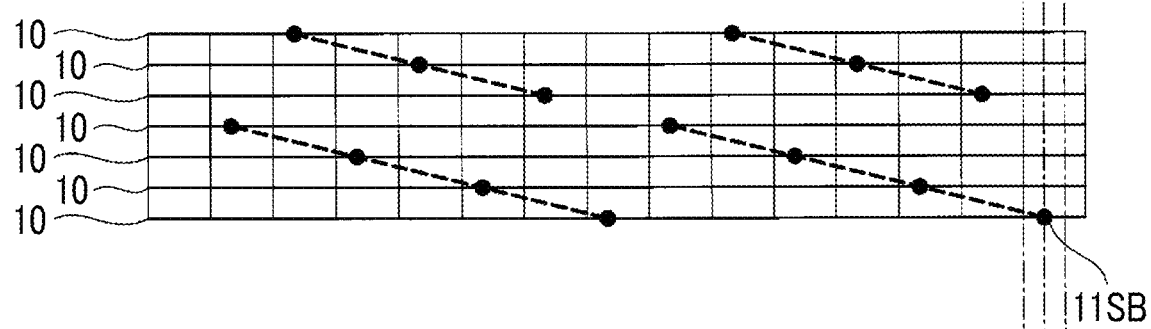
Figure 12:
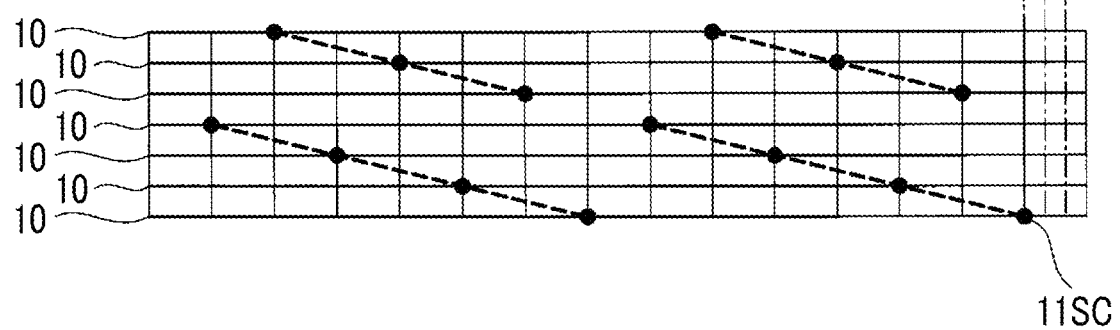

FIG. 11 illustrates a charge 1D in which the zero degree layer L0 is divided into a plurality of sections (section SA, section SB, and section SC) in a direction orthogonal to the fiber direction and the lamination direction. FIG. 12 illustrates a longitudinal sectional view taken along a cutting line A-A, a cutting line B-B, and a cutting line C-C in FIG. 11.

In the charge 1D, the respective split portions of the respective sections are aligned not to overlap each other in the direction in which the zero degree layer L0 is divided. With regard to this configuration, for example, the split portion in one end (for example, a right end) in the predetermined range in each section will be described as an example. That is, when the split portions on one end side of each of the section SA, the section SB, and the section SC are set to the split portion 11SA, the split portion 11SB, and the split portion 11SC, all of the split portions are aligned no to overlap each other in the direction in which the zero degree layer L0 is divided (one dot chain line in the drawing). In addition, the other split portions are aligned in the same manner. In this manner, it is possible to further suppress a decrease in the strength of the zero degree layer L0.

The zero degree layer L0 of the charge 1D is not cut into the plurality of sections in the direction orthogonal to the fiber direction and the lamination direction, and is simply divided.

Modification Example 2

FIG. 13 (lower drawing) illustrates a charge 1E in which the other prepreg 10 having a different fiber direction is interposed between the prepregs 10 forming the zero degree layer L0. In this case, the split portions (for example, split portions 81 and 82) adjacent to each other in the fiber direction are separated from each other in the lamination direction by the other prepreg 10. Accordingly, without separating the split portions adjacent to each other with a distance in the fiber direction compared to that illustrated in FIG. 13 (upper drawing), the split portions can be separated from each other at an interval (straight line distance). With regard to this configuration, in FIG. 13 (lower drawing), the split portion 81 and the split portion 82 are separated from each other by D3 in the fiber direction. In contrast, in FIG. 13 (upper drawing), the split portion 91 and the split portion 92 are separated from each other by D4 (<D3) in the fiber direction. In this case, the split portion 81 and the split portion 82 are farther separated from each other in the lamination direction than the split portion 91 and the split portion 92 due to the other prepreg 10 interposed therebetween. Therefore, the straight line distance between the split portion 81 and the split portion 82 is secured to a degree approximately the same as that of the straight line distance between the split portion 91 and the split portion 92. Therefore, it is possible to suppress a decrease in the strength of the zero degree layer L0. In addition, the predetermined range can be reduced while the interval between the split portions is secured to approximately the same degree. Accordingly, shaping performance of the charge 1E can be improved.

The composite material component shaping method and charge which are described in each of the embodiments are understood as follows, for example.

According to an aspect of the present disclosure, there is provided a composite material component shaping method for shaping a charge (1A, 1B, 1C, 1D, 1E) in which a plurality of reinforced fiber sheets (10) are laminated into a desired shape by using a shaping die (50). The method includes a lamination step of laminating the plurality of reinforced fiber sheets (10) to manufacture the charge (1A, 1B, 1C, 1D, 1E), and a shaping step of shaping the charge (1A, 1B, 1C, 1D, 1E) manufactured in the lamination step by pressing the charge (1A, 1B, 1C, 1D, 1E) in the shaping die (50). The charge (1A, 1B, 1C, 1D, 1E) includes a predetermined angle layer (L0) formed of the plurality of reinforced fiber sheets (10) in which fiber directions are aligned in one direction. The predetermined angle layer (L0) has the n-number of forming layers from a first forming layer (L1) to the n-th forming layer, each being formed of the plurality of reinforced fiber sheets (10) (n≥2). The n-th forming layer is laminated on the (n−1)-th forming layer. Each of the plurality of reinforced fiber sheets (10) in each of the forming layers has a split portion in each of the fiber directions at every one location in the predetermined angle layer (L0) in a predetermined range along the fiber direction. The respective split portions are regularly and repeatedly aligned in each of the forming layers along the fiber direction of the predetermined angle layer (L0), and are aligned not to overlap each other in a lamination direction of the predetermined angle layer (L0).

According to the composite material component shaping method according to this aspect, the method includes the lamination step of laminating the plurality of reinforced fiber sheets (10) on the shaping die (50) to manufacture the charge (1A, 1B, 1C, 1D, 1E), and the shaping step of shaping the charge (1A, 1B, 1C, 1D, 1E) manufactured in the lamination step by pressing the charge (1A, 1B, 1C, 1D, 1E) in the shaping die (50).

In this case, the charge (1A, 1B, 1C, 1D, 1E) includes the predetermined angle layer (L0) formed of the plurality of reinforced fiber sheets (10) in which the fiber directions are aligned in one direction. The predetermined angle layer (L0) has the n-number of the forming layers, each being formed of the plurality of reinforced fiber sheets (10). The first forming layer (L1), the second forming layer (L2), and so forth are laminated to form the predetermined angle layer (L0). Each of the plurality of reinforced fiber sheets (10) in each of the forming layers has each split portion divided in the fiber direction at every one location in the predetermined angle layer (L0) in the predetermined range (predetermined range along the fiber direction).

In this manner, elasticity of the predetermined angle layer (L0) in the fiber direction can be improved.

In addition, when the predetermined angle layer (L0) is viewed as a whole, the respective split portion are regularly and repeatedly aligned in each of the forming layers along the fiber direction of the predetermined angle layer (L0). For example, when n=2 is defined, and the predetermined angle layer (L0) is formed by the first forming layer (L1) and the second forming layer (L2) laminated on the first forming layer (L1), the respective split portions are aligned in the first forming layer (L1), the second forming layer (L2), the first forming layer (L1), and so forth along the fiber direction of the predetermined angle layer (L0) (alternatively, the order may be the second forming layer (L2), the first forming layer (L1), the second forming layer (L2), and so forth). That is, the split portions are not continuously aligned in the same forming layer along the fiber direction of the predetermined angle layer (L0).

In this manner, for example, compared to a case where the same number of the reinforced fiber sheets (10) are laminated as a whole to form the predetermined angle layer (predetermined angle layer of n=1) which is not divided in the lamination direction, while the distance of the split portions adjacent to each other in the fiber direction in the same forming layer can be secured to approximately the same degree, the predetermined range in the fiber direction can be shortened in the whole predetermined angle layer (L0). Therefore, shaping performance of the charge (1A, 1B, 1C, 1D, 1E) can be improved while the strength of the predetermined angle layer (L0) is maintained.

In addition, when the predetermined angle layer (L0) is viewed as a whole, the respective split portions are aligned not to overlap each other in the lamination direction of the reinforced fiber sheet (10).

In this manner, it is possible to avoid the plurality of split portions from being aligned in the same cross section in the lamination direction of the predetermined angle layer (L0), and it is possible to suppress a decrease in the strength of the predetermined angle layer (L0) in the same cross section. In addition, it is possible to eliminate a portion where the split portions are continuous in the lamination direction between the reinforced fiber sheets (10) adjacent to each other in the lamination direction. When there exists a portion where the split portions are continuous in the lamination direction, there is a possibility that the strength of the predetermined angle layer (L0) (strength of the charge (1A, 1B, 1C, 1D, 1E) which is guaranteed by the predetermined angle layer (L0)) may decrease in the portion. However, the portion where the split portions are continuous in the lamination direction can be eliminated. Accordingly, the decrease in the strength of the predetermined angle layer (L0) can be suppressed by suppressing influence of shearing forces acting on each other between the reinforced fiber sheets (10) adjacent to each other.

The number of the reinforced fiber sheets (10) in each of the forming layers may be the same, or the number of the reinforced fiber sheets (10) may be different depending on the forming layers.

In this aspect, the reinforced fiber sheet (10) is the prepreg (thermoplastic or thermosetting prepreg) or a dry tape, for example. In addition, for example, the predetermined angle layer (L0) is the zero degree layer in the charge.

In the composite material component shaping method according to an aspect of the present disclosure, in each of the forming layers, the respective split portions of the two reinforced fiber sheets (10) adjacent to each other in the lamination direction are adjacent to each other in the fiber direction.

According to the composite material component shaping method in this aspect, the respective split portions can be aligned at an equal interval on a straight line in each of the forming layers.

In this manner, the alignment of the split portions is patterned so that the charge (1A, 1B, 1C, 1D, 1E) can easily be molded.

In the composite material component shaping method according to an aspect of the present disclosure, the interval between the split portions adjacent to each other in the fiber direction in the predetermined angle layer (L0) is 1/n of the interval between the split portions adjacent to each other in the fiber direction in each of the forming layers.

According to the composite material component shaping method in this aspect, a distance between the split portions adjacent to each other in the fiber direction can be uniform in the predetermined angle layer (L0), and it is possible to suppress fluctuations in the strength of the predetermined angle layer (L0) along the fiber direction.

In the composite material component shaping method according to an aspect of the present disclosure, n=2 is defined, and the split portion of the reinforced fiber sheet (10) facing the second forming layer (L2) of each of the reinforced fiber sheets (10) of the first forming layer (L1) is located on one end side in the predetermined range in the fiber direction. The split portion of the reinforced fiber sheet (10) facing the first forming layer (L1) of each of the reinforced fiber sheets (10) of the second forming layer (L2) is located on the one end side in the predetermined range in the fiber direction.

According to the composite material component shaping method in this aspect, n=2 is defined. In this manner, the predetermined angle layer (L0) is formed by the first forming layer (L1) and the second forming layer (L2) laminated on the first forming layer (L1).

In the composite material component shaping method according to an aspect of the present disclosure, n=2 is defined, and the split portion of the reinforced fiber sheet (10) facing the first forming layer (L1) of each of the reinforced fiber sheets (10) of the second forming layer (L2) is located on one end side in the predetermined range in the fiber direction. The split portion of the reinforced fiber sheet (10) facing the second forming layer (L2) of each of the reinforced fiber sheets (10) of the first forming layer (L1) is located on the other end side in the predetermined range in the fiber direction.

According to the composite material component shaping method in this aspect, n=2 is defined. In this manner, the predetermined angle layer (L0) is formed by the first forming layer (L1) and the second forming layer (L2) laminated on the first forming layer (L1).

In addition, the split portion of the reinforced fiber sheet (10) facing the second forming layer (L2) in each of the reinforced fiber sheets (10) of the first forming layer (L1), and the split portion of the reinforced fiber sheet (10) facing the first forming layer (L1) in each of the reinforced fiber sheets (10) of the second forming layer (L2) can be separated farthest from each other to be aligned along the fiber direction in the predetermined range. When the split portions at two locations are aligned to be close to each other, there is a possibility that the strength of the predetermined angle layer (L0) (strength of the charge (1B) which is guaranteed by the predetermined angle layer (L0)) may decrease in the portion due to the influence of the shearing forces acting on each other between the reinforced fiber sheets (10) adjacent to each other in the lamination direction. However, the split portions at two locations are aligned by being separated from each other. In this manner, it is possible to suppress the decrease in the strength of the predetermined angle layer (L0).

In the composite material component shaping method according to an aspect of the present disclosure, n=4 is defined. The split portion of the reinforced fiber sheet (10) facing the first forming layer (L1) of each of the reinforced fiber sheets (10) of the second forming layer (L2) is located on one end side in the predetermined range in the fiber direction. The split portion of the reinforced fiber sheet (10) facing the second forming layer (L2) of each of the reinforced fiber sheets of the first forming layer (L1) is located on the other end side in the predetermined range in the fiber direction. The split portion of the reinforced fiber sheet (10) facing the second forming layer (L2) of each of the reinforced fiber sheets (10) of the third forming layer (L3) is located on the one end side in the predetermined range in the fiber direction. The split portion of the reinforced fiber sheet (10) facing the third forming layer (L3) of each of the reinforced fiber sheets (10) of the second forming layer (L2) is located on the other end side in the predetermined range in the fiber direction. The split portion of the reinforced fiber sheet (10) facing the third forming layer (L3) of each of the reinforced fiber sheets (10) of the fourth forming layer (L4) is located on the one end side in the predetermined range in the fiber direction. The split portion of the reinforced fiber sheet (10) facing the fourth forming layer (L4) of each of the reinforced fiber sheets (10) of the third forming layer (L3) is located on the other end side in the predetermined range in the fiber direction.

According to the composite material component shaping method according to this aspect, n=4 is defined. In this manner, the predetermined angle layer (L0) is formed by the first forming layer (L1), the second forming layer (L2) laminated on the first forming layer (L1), the third forming layer (L3) laminated on the second forming layer (L2), and the fourth forming layer (L4) laminated on the third forming layer (L3). That is, the number of the reinforced fiber sheets (10) in each of the forming layers is reduced. In this case, for example, when the predetermined range is the same as that in a case of n=2 (that is, the dimensions in the fiber direction are the same as each other), the split portions in the fiber direction can be further separated from each other at an interval. Therefore, the strength of the predetermined angle layer (L0) (strength of the charge (1C) which is guaranteed by the predetermined angle layer (L0)) can be improved by suppressing the influence of the shearing forces acting on each other between the reinforced fiber sheets (10) adjacent to each other.

In addition, for example, the respective split portions are aligned in order of the third forming layer (L3), the first forming layer (L1), the fourth forming layer (L4), the second forming layer (L2), the third forming layer (L3), the first forming layer (L1), the fourth forming layer (L4), the second forming layer (L2), and so forth along the fiber directions having a predetermined angle. Then, the split portions are not continuously aligned in the same forming layer along the fiber direction of the predetermined angle layer (L0).

In the composite material component shaping method according to an aspect of the present disclosure, the respective split portions are separated and aligned at an equal interval in the fiber direction of the predetermined angle layer (L0).

According to the composite material component shaping method in this aspect, a distance between the split portions adjacent to each other in the fiber direction can be uniform in the predetermined angle layer (L0), and it is possible to suppress fluctuations in the strength of the predetermined angle layer (L0) (strength of the charge (1A, 1B, 1C) which is guaranteed by the predetermined angle layer (L0)) along the fiber direction.

In the composite material component shaping method according to an aspect of the present disclosure, the predetermined angle layer (L0) is divided into a plurality of sections in a direction orthogonal to the fiber direction and the lamination direction. The respective split portions in each of the sections are aligned not to overlap each other in a direction in which the predetermined angle layer (L0) is divided.

According to the composite material component shaping method in this aspect, it is possible to avoid the split portions from being excessively continuous in the direction orthogonal to the fiber direction and the lamination direction.

In this manner, it is possible to further suppress a decrease in the strength of the predetermined angle layer (L0).

In the composite material component shaping method according to an aspect of the present disclosure, in the charge (1A, 1B, 1C, 1D, 1E), the other reinforced fiber sheet (10) having the fiber direction different from that of each of the reinforced fiber sheets (10) forming the predetermined angle layer (L0) is interposed between the respective reinforced fiber sheets (10) of the predetermined angle layer (L0).

According to the composite material component shaping method in this aspect, in the charge (1A, 1B, 1C, 1D, 1E), the other reinforced fiber sheet (10) having the fiber direction different from that of each of the reinforced fiber sheets (10) forming the predetermined angle layer (L0) is interposed between the respective reinforced fiber sheets (10) of the predetermined angle layer (L0). Therefore, the split portions adjacent to each other in the fiber direction in the same forming layer are separated from each other in the lamination direction. Accordingly, the split portions can be separated from each other at an interval without separating the split portions adjacent to each other with a distance in the fiber direction. Therefore, it is possible to suppress a decrease in the strength of the predetermined angle layer (L0).

In addition, the predetermined range can be reduced while the interval between the split portions is secured to approximately the same degree. Accordingly, shaping performance of the charge (1A, 1B, 1C, 1D, 1E) can be improved.

For example, the fiber direction of the other reinforced fiber sheet (10) is 45 degrees, −45 degrees, and 90 degrees when the fiber direction of the predetermined angle layer (L0) is zero degrees.

In the composite material component shaping method according to an aspect of the present disclosure, the shaping die (50) has a first surface (51) on which a curved surface is formed and a second surface (52) that intersects with the first surface (51). The lamination step includes a first surface alignment step of aligning the reinforced fiber sheets (10) on the first surface (51), a second surface alignment step of aligning the reinforced fiber sheets (10) on the second surface (52), and a splitting step of providing the split portion in the reinforced fiber sheet (10).

According to the composite material component shaping method in this aspect, even when the reinforced fiber sheet (10) is folded on the second surface (52) intersecting with the first surface (51) having a curved surface, the split portion of the reinforced fiber sheet (10) can absorb elasticity of the reinforced fiber sheet (10) on the second surface (52) which is caused by the influence of the curved surface formed on the first surface (51). A direction in which the reinforced fiber sheet (10) is elastic and the fiber direction of the predetermined angle layer (L0) substantially coincide with each other.

In the composite material component shaping method according to an aspect of the present disclosure, each of the split portions is folded toward the second surface (52) to be provided only in a range of the reinforced fiber sheet (10) aligned on the second surface (52).

According to the composite material component shaping method in this aspect, a time required for providing the split portion can be reduced by limiting a range in which the split portion is provided. The reason is as follows. The range in which the split portion is provided may sufficiently fall at least within the range in which the reinforced fiber sheet (10) can be elastic.

According to another aspect of the present disclosure, there is provided a charge (1A, 1B, 1C, 1D, 1E) in which a plurality of reinforced fiber sheets (10) are laminated. The charge (1A, 1B, 1C, 1D, 1E) includes a predetermined angle layer (L0) formed of the plurality of reinforced fiber sheets (10) in which fiber directions are aligned in one direction. The predetermined angle layer (L0) has the n-number of forming layers from a first forming layer (L1) to the n-th forming layer, each being formed of the plurality of the reinforced fiber sheets (10) (n≥2). The n-th forming layer is laminated on the (n−1)-th forming layer. Each of the plurality of the reinforced fiber sheets (10) in each of the forming layers has a split portion in each of the fiber directions at every one location in the predetermined angle layer (L0) in a predetermined range along the fiber direction. The respective split portion are regularly and repeatedly aligned in each of the forming layers along the fiber direction of the predetermined angle layer (L0), and are aligned not to overlap each other in a lamination direction of the predetermined angle layer (L0).

According to the charge in this aspect, the charge (1A, 1B, 1C, 1D, 1E) includes the zero degree layer (L0) formed of the plurality of reinforced fiber sheets (10) in which the fiber directions are aligned in one direction. The predetermined angle layer (L0) has the n-number of the forming layers, each being formed of the plurality of reinforced fiber sheets (10). The first forming layer (L1), the second forming layer (L2), and so forth are laminated to form the predetermined angle layer (L0).

In this case, the plurality of reinforced fiber sheets (10) in each of the forming layers have the split portions divided in each of the fiber directions at every one location in the predetermined angle layer (L0) in the predetermined range (predetermined range along the fiber direction).

In this manner, it is possible to provide the charge in which elasticity of the predetermined angle layer (L0) in the fiber direction is improved.

In addition, when the predetermined angle layer (L0) is viewed as a whole, the respective split portion are regularly and repeatedly aligned in each of the forming layers along the fiber direction of the predetermined angle layer (L0). For example, when n=2 is defined, and the predetermined angle layer (L0) is formed by the first forming layer (L1) and the second forming layer (L2) laminated on the first forming layer (L1), the respective split portions are aligned in the first forming layer (L1), the second forming layer (L2), the first forming layer (L1), and so forth along the fiber direction of the predetermined angle layer (L0) (alternatively, the order may be the second forming layer (L2), the first forming layer (L1), the second forming layer (L2), and so forth). That is, the split portions are not continuously aligned in the same forming layer along the fiber direction of the predetermined angle layer (L0). In this manner, for example, compared to a case where the same number of the reinforced fiber sheets (10) are laminated as a whole to form the predetermined angle layer (zero degree layer of n=1) which is not divided in the lamination direction, while the distance of the split portions adjacent to each other in the fiber direction in the same forming layer can be secured to approximately the same degree, the predetermined range in the fiber direction can be shortened in the whole predetermined angle layer (L0). Therefore, it is possible to provide the charge (1A, 1B, 1C, 1D, 1E) showing satisfactory shaping performance while the strength of the predetermined angle layer (L0) is maintained.

In addition, when the predetermined angle layer (L0) is viewed as a whole, the respective split portions are aligned not to overlap each other in the lamination direction of the reinforced fiber sheet (10).

In this manner, it is possible to avoid the plurality of split portions from being aligned in the same cross section in the lamination direction of the predetermined angle layer (L0), and it is possible to suppress a decrease in the strength of the predetermined angle layer (L0) in the same cross section. In addition, it is possible to eliminate the portion where the split portions are continuous in the lamination direction between the reinforced fiber sheets (10) adjacent to each other. When there exists a portion where the split portions are continuous in the lamination direction, there is a possibility that the strength of the predetermined angle layer (L0) (strength of the charge (1A, 1B, 1C, 1D, 1E) which is guaranteed by the predetermined angle layer (L0)) may decrease in the portion. However, the portion where the split portions are continuous in the lamination direction can be eliminated. Accordingly, the decrease in the strength of the predetermined angle layer (L0) can be suppressed by suppressing influence of shearing forces acting on each other between the reinforced fiber sheets (10) adjacent to each other.

REFERENCE SIGNS LIST 1A, 1B, 1C, 1D, 1E charge
10 reinforced fiber sheet (prepreg)
11A to 17A, 11B to 17B, 11C to 14C split portion
21A to 27A, 21B to 27B, 21C to 24C split portion
31C to 34C split portion
41C to 43C split portion
50A, 50B, 50C, 50D, 50E shaping die
51A, 51B, 51C, 51D, 51E first surface
52A, 52B, 52C, 52D, 52E second surface
81, 82 split portion
L0 predetermined angle layer (zero degree layer)
L1 first forming layer
L2 second forming layer
L3 third forming layer
L4 fourth forming layer

The invention claimed is:

1. A composite material component shaping method for shaping a charge in which a plurality of reinforced fiber sheets are laminated into a desired shape by using a shaping die, the method comprising:
a lamination step of laminating the plurality of reinforced fiber sheets to manufacture the charge; and
a shaping step of shaping the charge manufactured in the lamination step by pressing the charge in the shaping die,
wherein the charge includes a predetermined angle layer formed of the plurality of reinforced fiber sheets in which fiber directions are aligned in one direction,
the predetermined angle layer has the n-number of forming layers from a first forming layer to an n-th forming layer, each being formed of the plurality of reinforced fiber sheets (n≥2),
the n-th forming layer is laminated on an (n−1)-th forming layer,
each of the plurality of reinforced fiber sheets in each of the forming layers has a split portion in each of the fiber directions at every one location in the predetermined angle layer in a predetermined range along the fiber direction, and
the respective split portions are regularly and repeatedly aligned in each of the forming layers along the fiber direction of the predetermined angle layer so that the split portions are not continuously aligned in a same forming layer in order from one end side in the fiber direction in the predetermined range, and the split portions are aligned not to overlap each other in a lamination direction of the predetermined angle layer when the predetermined angle layer is viewed as a whole.

2. The composite material component shaping method according to claim 1,
wherein in each of the forming layers, the split portions of two sheets of the reinforced fiber sheets adjacent to each other in the lamination direction are adjacent to each other in the fiber direction.

3. The composite material component shaping method according to claim 1,
wherein an interval between the split portions adjacent to each other in the fiber direction in the predetermined angle layer is 1/n of an interval between the split portions adjacent to each other in the fiber direction in each of the forming layers.

4. The composite material component shaping method according to claim 2,
wherein n=2 is defined,
the split portion of the reinforced fiber sheet facing a second forming layer of each of the reinforced fiber sheets of the first forming layer is located on the one end side in the predetermined range in the fiber direction, and
the split portion of the reinforced fiber sheet facing the first forming layer of each of the reinforced fiber sheets of the second forming layer is located on the one end side in the predetermined range in the fiber direction.

5. The composite material component shaping method according to claim 2,
wherein n=2 is defined,
the split portion of the reinforced fiber sheet facing the first forming layer of each of the reinforced fiber sheets of the second forming layer is located on the one end side in the predetermined range in the fiber direction, and
the split portion of the reinforced fiber sheet facing the second forming layer of each of the reinforced fiber sheets of the first forming layer is located on the other end side in the predetermined range in the fiber direction.

6. The composite material component shaping method according to claim 2,
wherein n=4 is defined,
the split portion of the reinforced fiber sheet facing the first forming layer of each of the reinforced fiber sheets of the second forming layer is located on the one end side in the predetermined range in the fiber direction,
the split portion of the reinforced fiber sheet facing the second forming layer of each of the reinforced fiber sheets of the first forming layer is located on the other end side in the predetermined range in the fiber direction,
the split portion of the reinforced fiber sheet facing the second forming layer of each of the reinforced fiber sheets of the third forming layer is located on the one end side in the predetermined range in the fiber direction,
the split portion of the reinforced fiber sheet facing the third forming layer of each of the reinforced fiber sheets of the second forming layer is located on the other end side in the predetermined range in the fiber direction,
the split portion of the reinforced fiber sheet facing the third forming layer of each of the reinforced fiber sheets of the fourth forming layer is located on the one end side in the predetermined range in the fiber direction, and
the split portion of the reinforced fiber sheet facing the fourth forming layer of each of the reinforced fiber sheets of the third forming layer is located on the other end side in the predetermined range in the fiber direction.

7. The composite material component shaping method according to claim 1,
   wherein the respective split portions are separated and aligned at an equal interval along the fiber direction of the predetermined angle layer.

8. The composite material component shaping method according to claim 1,
   wherein the predetermined angle layer is divided into a plurality of sections in a direction orthogonal to the fiber direction and the lamination direction, and
   the respective split portions in each of the sections are aligned not to overlap each other in a direction in which the predetermined angle layer is divided.

9. The composite material component shaping method according to claim 1,
   wherein in the charge, another reinforced fiber sheet having the fiber direction different from that of each of the reinforced fiber sheets forming the predetermined angle layer is interposed between the respective reinforced fiber sheets of the predetermined angle layer.

10. The composite material component shaping method according to claim 1,
   wherein the shaping die has a first surface on which a curved surface is formed and a second surface that intersects with the first surface, and
   the lamination step includes a first surface alignment step of aligning the reinforced fiber sheet on the first surface, a second surface alignment step of aligning the reinforced fiber sheet on the second surface, and a splitting step of providing the split portion in the reinforced fiber sheet.

11. The composite material component shaping method according to claim 10,
   wherein each of the split portions is folded toward the second surface to be provided only in a range of the reinforced fiber sheet aligned on the second surface.

12. A charge in which a plurality of reinforced fiber sheets are laminated, the charge comprising:
   a predetermined angle layer formed of the plurality of reinforced fiber sheets in which fiber directions are aligned in one direction,
   wherein the predetermined angle layer has the n-number of forming layers from a first forming layer to an n-th forming layer, each being formed of the plurality of reinforced fiber sheets (n≥2),
   the n-th forming layer is laminated on an (n−1)-th forming layer,
   each of the plurality of reinforced fiber sheets in each of the forming layers has a split portion in each of the fiber directions at every one location in the predetermined angle layer in a predetermined range along the fiber direction, and
   the respective split portions are regularly and repeatedly aligned in each of the forming layers along the fiber direction of the predetermined angle layer so that the split portions are not continuously aligned in a same forming layer in order from one end side in the fiber direction in the predetermined range, and the split portions are aligned not to overlap each other in a lamination direction of the predetermined angle layer when the predetermined angle layer is viewed as a whole.

* * * * *